United States Patent

Arnaud et al.

[11] Patent Number: 5,473,227
[45] Date of Patent: Dec. 5, 1995

[54] SELF-SYNCHRONOUS ELECTRICAL MOTOR

[75] Inventors: Georges Arnaud, Orsay; Jean-Claude Soroka, Chatou; Pascal Besnier, Paris, all of France

[73] Assignee: Auxilec, Chatou, France

[21] Appl. No.: 49,131

[22] Filed: Apr. 19, 1993

[30] Foreign Application Priority Data

Jun. 23, 1992 [FR] France .................................. 92 07625

[51] Int. Cl.⁶ ..................................................... H02P 3/00
[52] U.S. Cl. ........................ 318/139; 318/690; 318/695
[58] Field of Search ...................................... 318/700, 704, 318/716–719, 721, 724, 138, 254, 139, 438, 690–695

[56] References Cited

U.S. PATENT DOCUMENTS

| | | |
|---|---|---|
| 3,573,578 | 4/1971 | Shibata . |
| 3,631,273 | 12/1971 | Stein ............................................ 310/46 |
| 3,679,953 | 7/1972 | Bedford ..................................... 318/138 |
| 3,749,991 | 7/1973 | Kuniyoshi ................................. 318/254 |
| 3,786,287 | 1/1974 | Stein ........................................... 310/46 |
| 4,004,203 | 1/1977 | Chalmors . |
| 4,450,396 | 4/1984 | Thornton .................................. 318/721 |
| 4,567,407 | 1/1986 | Ecklin ................................... 318/138 X |
| 5,053,662 | 10/1991 | Richter .................................. 318/702 X |
| 5,075,610 | 12/1991 | Harris .......................................... 318/701 |

FOREIGN PATENT DOCUMENTS

| | | |
|---|---|---|
| 3132129 | 8/1980 | Germany . |
| 0142559 | 12/1930 | Switzerland . |
| 2235836 | 8/1990 | United Kingdom . |

OTHER PUBLICATIONS

Patent Abstracts of Japan, vol. 008, No. 166 (M–314) 2 Aug. 1984.

*Primary Examiner*—David S. Martin
*Attorney, Agent, or Firm*—Roland Plottel

[57] ABSTRACT

A self-synchronous electrical motor comprises one rotor, one stator formed by at least one set of four stator windings, at least one electronic switch connected to a stator winding to control the current in the stator winding and a sensor of the angular position of the rotor to control the working of the switch. It also has a rotating commutator device, driven by the rotor, to shunt a current coming from a power supply source into windings selected as a function of the position of the rotor. The commutator device is connected to a first end of each of the windings, the second end of two of the windings being connected to the power supply source and the second end of the other two windings being connected to the electronic switch. Application notably to electrical traction systems for automobiles.

10 Claims, 8 Drawing Sheets

SELF-SYNCHRONOUS ELECTRICAL MOTOR

BACKGROUND OF THE INVENTION

1. Field of the Invention

The present invention relates to self-synchronous electrical motors that can be used notably in electrical traction systems for automobiles.

It will be recalled that a self-synchronous motor is a motor in which a magnetic field is produced at the stator, said magnetic field rotating at exactly the same speed as the rotor, whatever may be this speed, i.e. especially when the motor is started up. A sensor of the rotor position is used to synchronize the rotating magnetic field created at the stator.

In the field of the technology of electrical traction for automobiles, there is the major problem of reducing the quantity and cost price of the raw material used as well as the number of electronic components used for the controls.

The aim of the present invention is to achieve a self-synchronous electrical motor that can be used in an electrical traction system for automobiles, this motor being cheaper and more reliable than prior art motors while, at the same time, meeting standards laid down by regulations and especially safety standards.

2. Description of the Prior Art

Known self-synchronous motors comprise generally star-connected stator windings that are series-connected with electronic switches. These switches are actuated at a frequency (that can be called a high frequency) which is far higher than the electrical frequency of the rotating magnetic fields generated at the stator; the (low) frequency of the rotating magnetic fields corresponds to the speed of rotation of the motor. The switches are used to chop the current at high frequency with a cyclical ratio that is variable so that it is possible, firstly, to control the value of the mean current in the stator windings during periodic time intervals (low frequency) when a current effectively flows in these windings and, secondly, to totally interrupt this current during other periodic time intervals (low frequency). With several stator windings and, hence, several switches, it is possible to shunt or route the current successively (at low frequency) into the windings so as to create a rotating stator magnetic field. The envelope of variation of the mean current in a winding is defined by the variation of the cyclical ratio of the chopped current, which can be adjusted at will as a function of the waveform desired for the mean current. These self-synchronous motors use at least as many electronic switches as windings and these electronic switches are costly especially if high currents go through them, which is the case in automobiles.

The present invention is aimed at reducing the cost of the motor and increasing its reliability without lowering its performance characteristics.

SUMMARY OF THE INVENTION

The present invention proposes a self-synchronous electrical motor comprising a rotor, a stator possessing at least one set of four windings offset by 90 electrical degrees with respect to one another, at least one electronic switch that is series-connected with a stator winding and activated by a chopper circuit at high frequency to control a mean current in the stator winding and a sensor of angular position of the rotor to activate the chopper circuit. It comprises also a rotating mechanical commutator or change-over switch device driven by the rotor to shunt or route the current given by a power supply source into windings selected as a function of the position of the rotor, the commutator device being connected to a first end of each of the windings, the second end of two of the windings being connected to the power supply source, and the second end of the other two windings being connected to the electronic switch. The commutator device then enables the current to be made to flow into the successive pairs of two series-connected windings taken from among the four windings (the two windings of a pair crossed by the current at a given instant being offset by 90 electrical degrees).

This arrangement makes it possible to limit the number of costly electronic switches while, at the same time, keeping the possibility of constantly controlling the amplitude of the mean current in the different windings (which makes it possible notably to check the evenness of the motor torque). Furthermore, unlike in electrical motors which work exclusively on the basis of mechanical commutators, the current can be cut off by electronic switches at the instants when the mechanical commutator device is switching over or commutating, thus preventing sparks in this device.

The commutator device is made out of rings and brushes that rub against the rings. In principle, the rings are borne by the rotor and the brushes are fixed. Preferably, each brush is connected to one end of a stator winding, and the ring has at least one conductive part capable of connecting the brushes to one another.

So that the motor according to the invention can work as a brake generator, provision is made, preferably, for an additional electronic switch with a corresponding chopper circuit, the switch being parallel-connected to the stator windings, with a diode in series between the power supply and the stator windings, to prevent the passage of a power supply source discharging current.

The motor according to the invention, supplied by a rechargeable power supply source when it is in operation, comprises means to recharge this power supply source when it is is stopped and when it is connected to the mains. The means to recharge the power supply source make direct use of one or more windings and one or more electronic switches of the motor.

These means use the electronic control switch, the rotor and at least one stator winding, this winding forming the secondary winding of a transformer, the primary winding of which is formed by a rotor.

There is consequently no need for power supply recharging circuits distinct from those used to make the motor work. Above all, it is possible to use electronic switches that are already present in the motor and are particularly costly.

BRIEF DESCRIPTION OF THE DRAWINGS

Other features and advantages of the invention will appear from the following description, made with reference to the appended drawings, of which:

FIG. 4 shows the electrical diagram of the circuit that provides for the operation, in charger mode, of the motor of

FIG. 1.

In all the figures, the same references are repeated for the same elements.

MORE DETAILED DESCRIPTION

Figure 1:
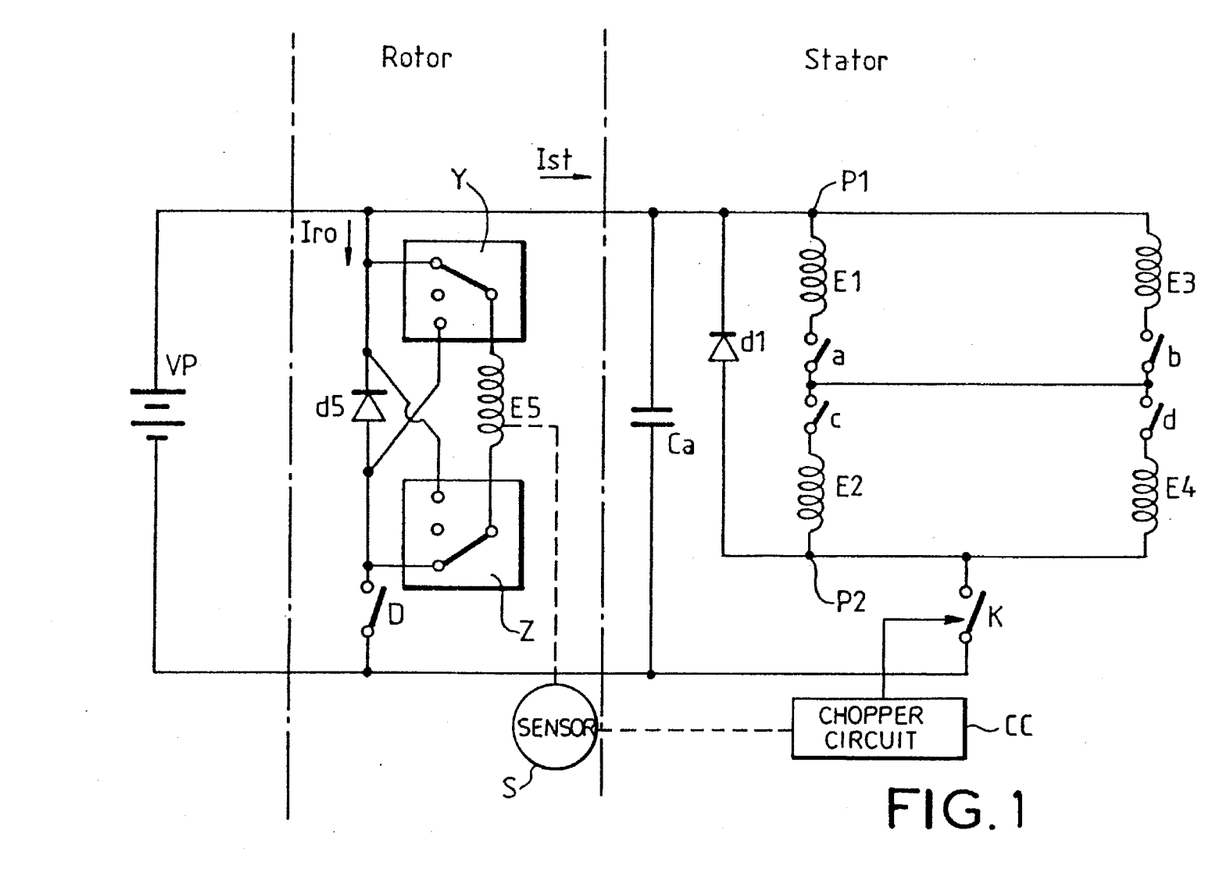
FIG. 1 shows the electrical circuit of a self-synchronous motor according to the invention.

FIG. 1 shows a self-synchronous motor according to the invention, according to a second embodiment. The motor is formed by a coiled stator with 2n poles and four separate windings (E1, E2, E3, E4) offset with respect to one another by 90 electrical degrees and by a coiled rotor with 2n poles and only one winding (E5) supplied by rings and brushes that are not shown in the figure. The rotor may be a rotor that works with permanent magnets and is not coiled. The stator windings E1 and E3, E2 and E4 are offset with respect to one another by 180 electrical degrees The commutator device that provides for the routing of the current into the stator windings herein comprises four star-connected commutators a, b, c, d. Each of the windings E1, E2, E3, E4 is connected to a respective commutator: the winding E1 is connected to the commutator a, the winding E2 to the commutator c, the winding E3 to the commutator b and the winding E4 to the commutator d. Those ends of the windings which are not connected to the commutators are connected to one another two by two. Thus, firstly, the windings E1 and E3 and, secondly, the windings E2 and E4 are connected to each other respectively at the points P1 and P2. The point P1 is connected to a first terminal of a supply source VP (which in this case is the positive terminal of an accumulator or battery) and the point P2 is connected to the first end of a chopper K, the second end of which is connected to the supply source VP so as to shut the electrical circuit.

The frequency of the chopper K is far higher than the commutation frequency of the commutator device, the latter value corresponding to the rotation speed of the rotor. The control of the value of the mean current in the stator windings is essentially achieved by the modulation of the cyclical ratio of the turning on of the choppers. The chopper K is an electronic switch (a bipolar transistor, MOSFET, IGBT, thyristor, etc.) controlled by a chopper circuit (CC). There are known ways of making chopper circuits that can be used to set up desired mean current waveforms.

The four mechanical commutators a, b, c, d, enable the stator current Ist to be routed respectively into the windings E1+E2, E3+E2, E3+E4 and E1+E4 so as to create a rotating stator field. The commutator device a, b, c, d is mechanical and is made with a ring/brush assembly. It is driven in rotation by the rotor. It therefore carries out a routing of the stator currents in the windings synchronism with the rotation of the rotor.

The windings E1+E2, E3+E2, E3+E4, E1+E4 are the seat of alternating counter-electromotive forces, the amplitude of which, in motor mode operation, is lower than the supply voltage of the supply source VP.

The electronic chopper K enables controlling the changes undergone by the mean current in these windings. A diode d1, known as a "free wheel diode", parallel connected with the pair of windings E1, E2, is used to absorb the current transients that are due to the presence of the windings and that appear during the opening and closing of the chopper K. A capacitor Ca, used in a manner known to those skilled in the art to inject current into the stator windings at appropriate moments, is placed in parallel with the voltage supply VP.

The electronic control of the chopper K is synchronized with the rotation of the rotor. It is such that the stator magnetic field is maintained in phase quadrature with respect to the rotor field to give a maximum torque. This is achieved by means of sensors S of the angular position of the rotor.

The chopper K, accompanied by the diode d1, therefore controls the value of the stator current as a function of the angular position of the rotor and as a function of the desired torque (this control can be achieved by any possible type of modulation, including PWM modulation). More specifically, given that the stator currents are activated as a function of the position of angular position of the rotor, this position is detected by means of angular position sensors S so as to enable the activation, after processing in a processor, of the chopper to optimize the working and efficiency of the motor.

The control of the stator current by the chopper K is preferably such that, during the routing of the current from one winding towards another one by the mechanical commutator device, the current is zero in the windings. The risks of sparks in the commutator device are reduced or even eliminated and the wearing out of the brushes of the commutator device is reduced.

One advantage of this assembly as compared with prior art assemblies is that the stator current is controlled by means of only one electronic switch K and only one free wheel diode, thus making it possible to reduce the cost of the motor since these switches are particularly costly.

Another advantage of this assembly lies in the fact that the assembly constituted by the four commutators a, b, c, d is not connected to the supply voltage of the battery VP, which simplifies the wiring of the circuit.

The rotor current Iro is controlled by means of a chopper D. The chopper D is an electronic switch, for example a transistor, which controls the excitation current flowing through the rotor winding E5 by pulse width modulation. A free wheel diode d5 is parallel connected with the rotor winding E5. The reversal of the direction of operation of the electrical machine is done by the reversal of the direction of the current in the winding E5, for example by means of two commutators Y and Z, and two wiring elements as is known to those skilled in the art and shown in FIG. 1.

Figure 2:
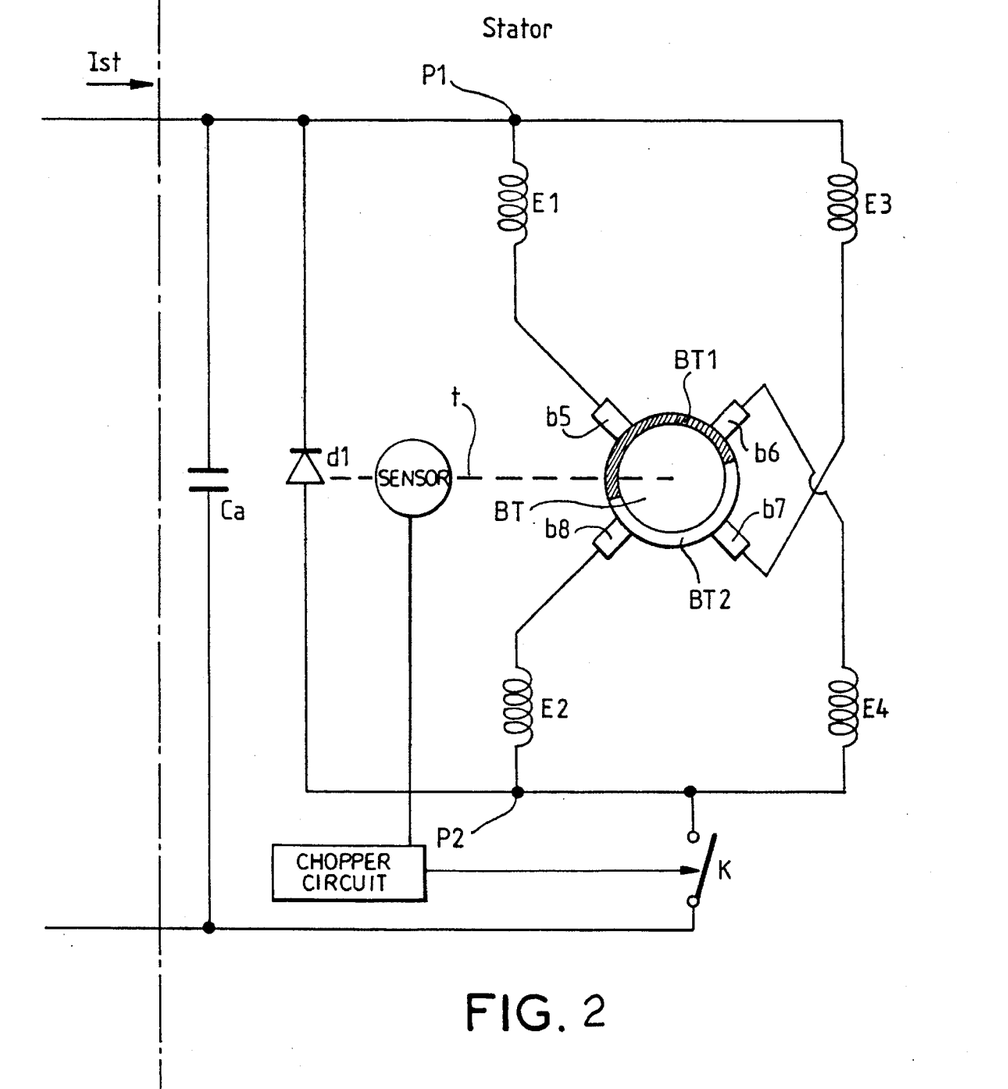
FIG. 2 shows a preferred embodiment of the circuit described in FIG. 1.

FIG. 2 shows the preferred embodiment of the circuit described with reference to FIG. 1.

According to this embodiment, the rotating machine working in motor mode is a 2-pole machine and the commutation device constituted by the four commutators a, b, c, d comprise a rotating ring BT and four brushes b5, b6, b7, b8. The rotating ring BT is, for example, constituted on the first half of its upper part by a conductive half-ring BT1 and, on the second half of its lower part, by an insulating half-ring BT2. The ring BT rotates by means of a mechanical driving system connected to the rotor and represented symbolically in the figure by the line of dashes t. In rotating, the conductive half-ring BT1 successively sets up the connections of the brushes b5 and b8, b8 and b7, b7 and b6, b6 and b5, thus successively connecting the windings E1 and E2, E2 and E3, E3 and E4, E4 and E1. When two windings are connected, there is a chopping of the current at high frequency by the switch K and when there is a commutation from one winding to another, the electronic switch K is open.

Figure 3:
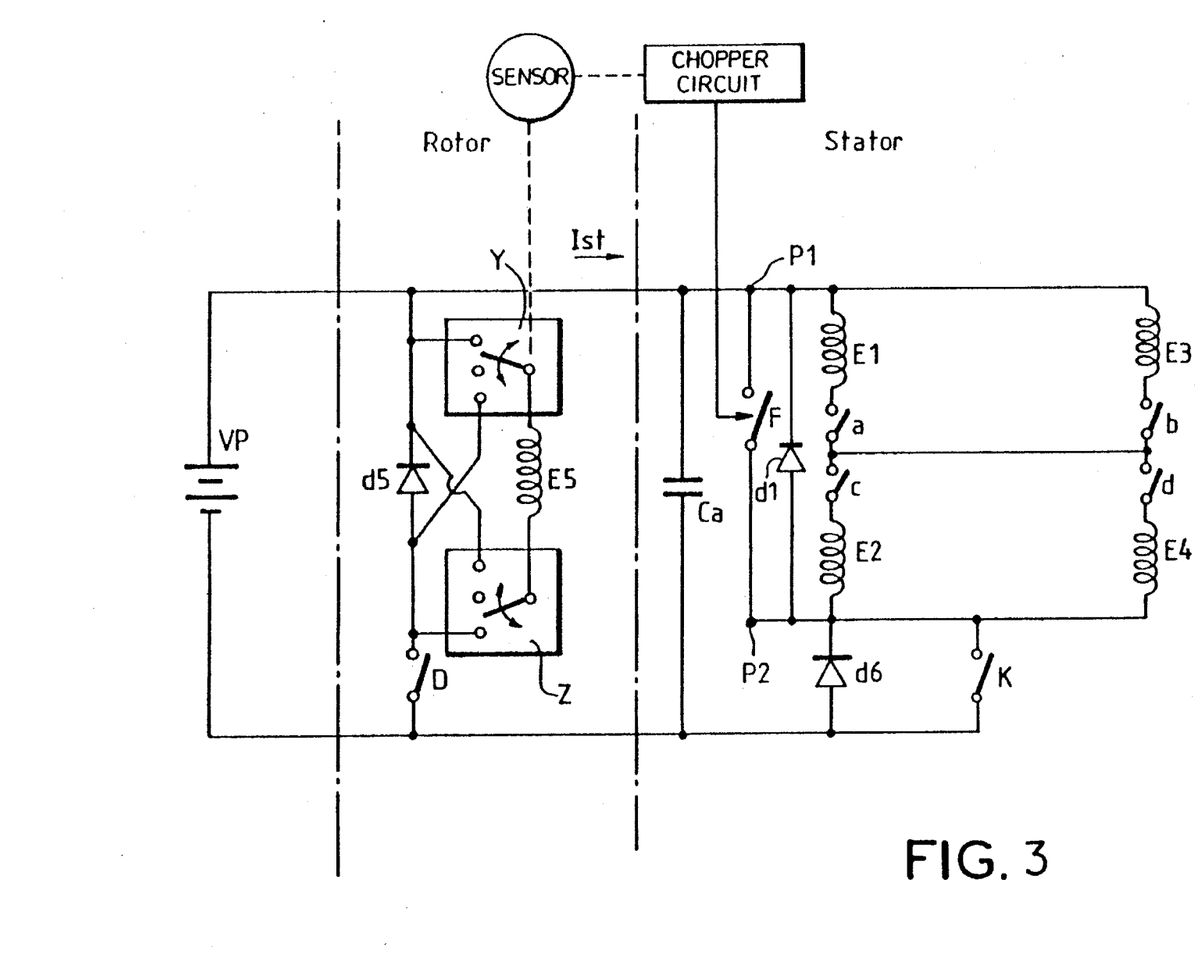
FIG. 3 shows the electrical diagram of the circuit that provides for the operation, in brake generator mode, of the motor of FIG. 1.

FIG. 3 shows an electrical diagram of the circuit that enables the working, as a brake generator, of the motor of FIG. 1.

The change to brake generator mode is achieved by reversal of the stator current: the chopper K is turned off. Another chopper F and a free wheel diode d6 are provided for. The chopper F is parallel-connected to the stator windings between the previously defined points P1 and P2 while the free wheel diode d6 is placed between the point P2 and the supply VP so as to shut the electrical circuit in letting through the currents only in the direction that is the reverse of the direction in motor operation. The counter-electromotive force developed in the stator windings creates a current that flows into the closed chopper F. In opening the chopper, this current is forced to flow through the diode d6 towards the supply source VP in a direction that tends to recharge the source VP. The magnetic flux can be controlled by the chopper D which controls the mean current in the rotor winding (in the case of a coiled rotor only). In figure 3, the chopper K and the free wheel diode d1 of the motor do not come into play during operation in brake generator mode. The commutator device may be that of FIG. 2.

The chopper K controls the passage of the stator current Ist in width modulation by short-circuiting the windings that are connected. Hence, accompanied by the diode d6, it constitutes a control circuit of the stator current.

The brake torque is controlled by the control achieved by the chopper F over the stator current Ist. One advantage of the circuit of FIG. 3 lies in the fact that the braking can be done by means of all four windings. Another advantage of the invention lies in the fact that operation in brake generator mode is compatible with very low speeds.

The flux is controlled by the same excitation circuit as for the operation in motor mode.

Figure 4:
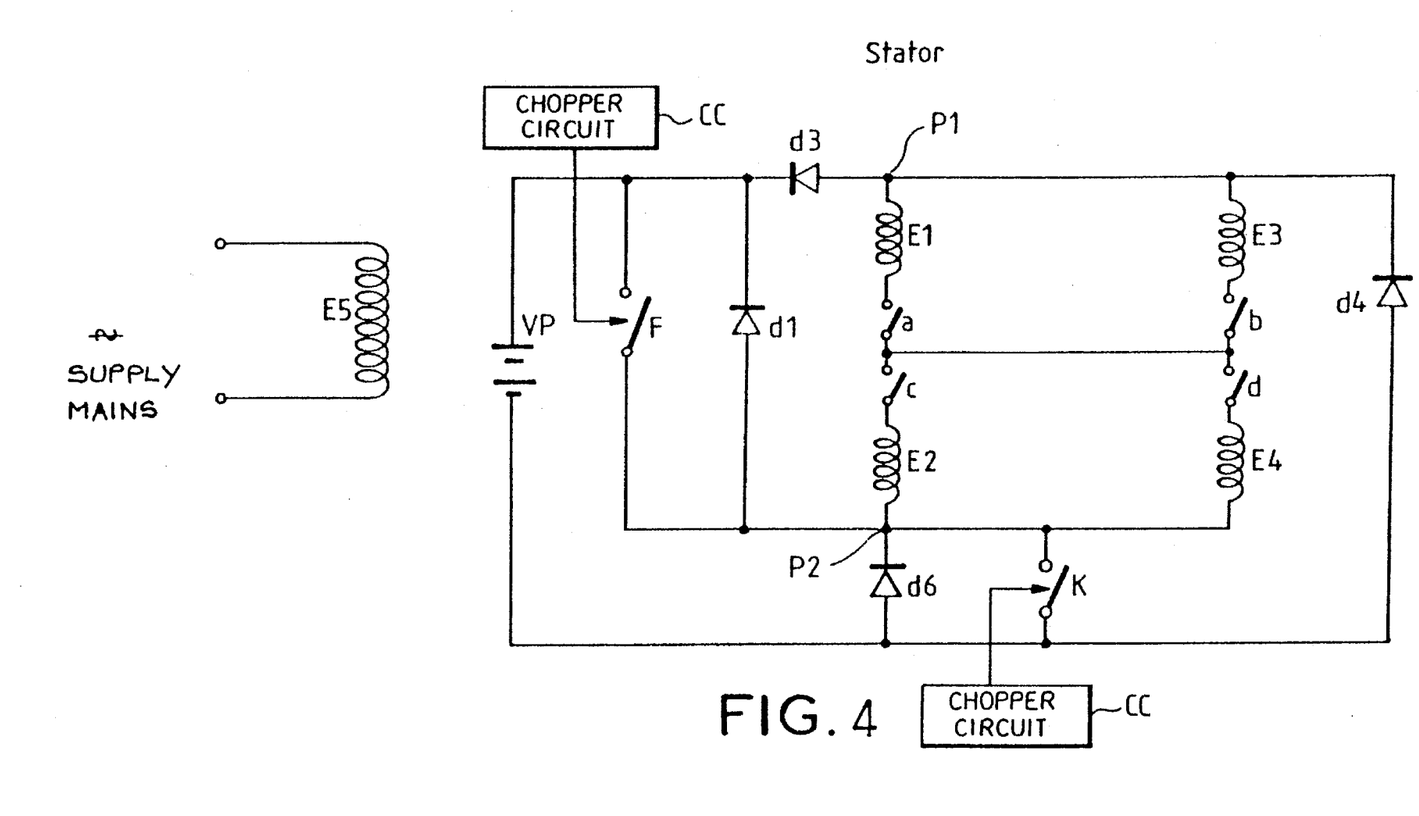

FIG. 4 shows the electrical diagram of a motor according to the invention with a charger function when it has stopped. This self-synchronous motor is of the type shown and described in FIGS. 1 and 3. This motor therefore has four mechanical commutators a, b, c, d and at least one electronic switch K.

The rotor winding E5 is then connected to the mains. It forms the primary winding of a transformer, the stator windings forming the secondary winding.

The point P1 is connected to the positive terminal of the power supply VP by means of a diode d3 which lets through the current in the direction in which the source VP is charged. The point P2 is connected to the negative terminal of the supply VP by means of the chopper K and the diode d6 which is in parallel with said chopper K. The positive terminal of the supply VP is connected, for its part, to the point P2 by means of the chopper F and the diode d1 which is in parallel with said chopper F.

The assembly of the four diodes d1, d3, d4, d6 constitutes a diode bridge that can be used to perform a double half-wave rectification activated by the choppers F and K.

When the machine is at a stop, two stator windings are series connected. These windings are either (E1, E2) or (E1, E4) or (E3, E2) or (E3, E4), depending on the position of the commutators a, b, c, d. A sinusoidal electromotive force at the frequency of the mains supply is present at the terminals of these two stator windings. These two windings form the secondary winding of the transformer.

The operation in charger mode is carried out here on the two half-waves of the sinusoidal electromotive force. For the first half-wave, only the diode d3, the diode d6 and the switch F come into play (the switch K is kept off). For the second half-wave, only the diode d1, the diode d4 and the switch K come into play (the switch F is kept off).

In the first half-wave, the switch F is switched over to the high frequency (far higher than the frequency of the mains); while it is closed, the current generated in the stator windings gets closed up through the diode d3 (on) and the closed switch F; when the switch opens, the inductive current continues to flow through the diode d3, the source VP and the diode d6, thus recharging the source VP. During the second half-wave, the operation is the same with the elements d4, K and d1.

Figure 6:
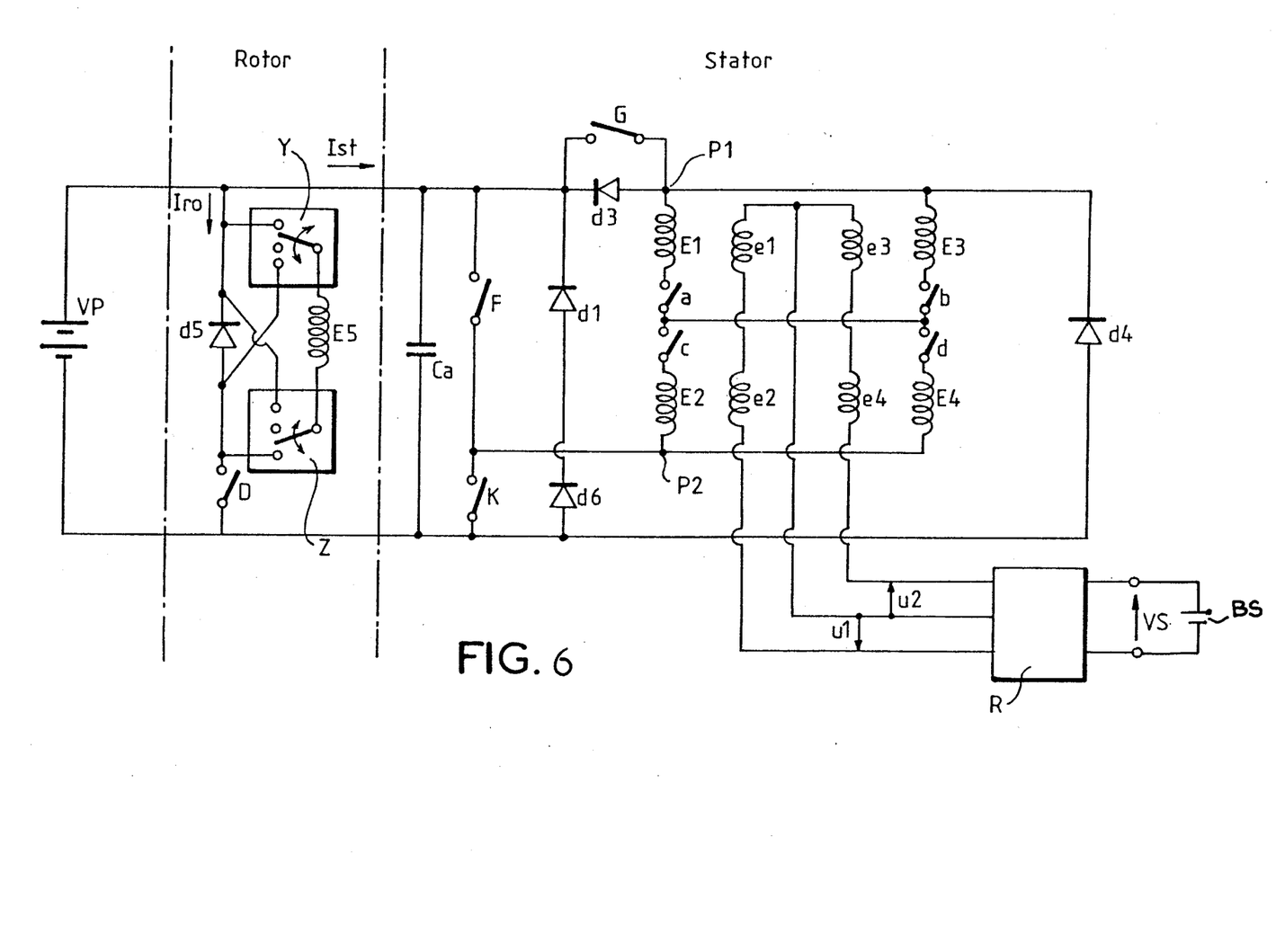
FIG. 6 shows the electrical diagram of the circuit providing for the operation, in motor, brake generator, charger and converter modes, of an electrical traction system for automobiles that uses the self-synchronous motor shown in FIGS. 1 to 5.

The recharging can also be done solely during the second half-wave, thus making it possible to avoid using an electronic switch F, only the diode d4 having to be added to the motor of FIG. 4. However, if the motor is already organized so that it has to work in brake generator mode, a switch F and a diode d6 are available in addition to the switch K (FIG. 6). It is then advantageous to make a charger working in double half-wave mode by means of the existing elements to which only the diode d3 is added.

One advantage of the control device is that it makes it possible to limit the harmonics rate taken at the mains and to work with a value of cos(phi) close to 1.

Figure 5:
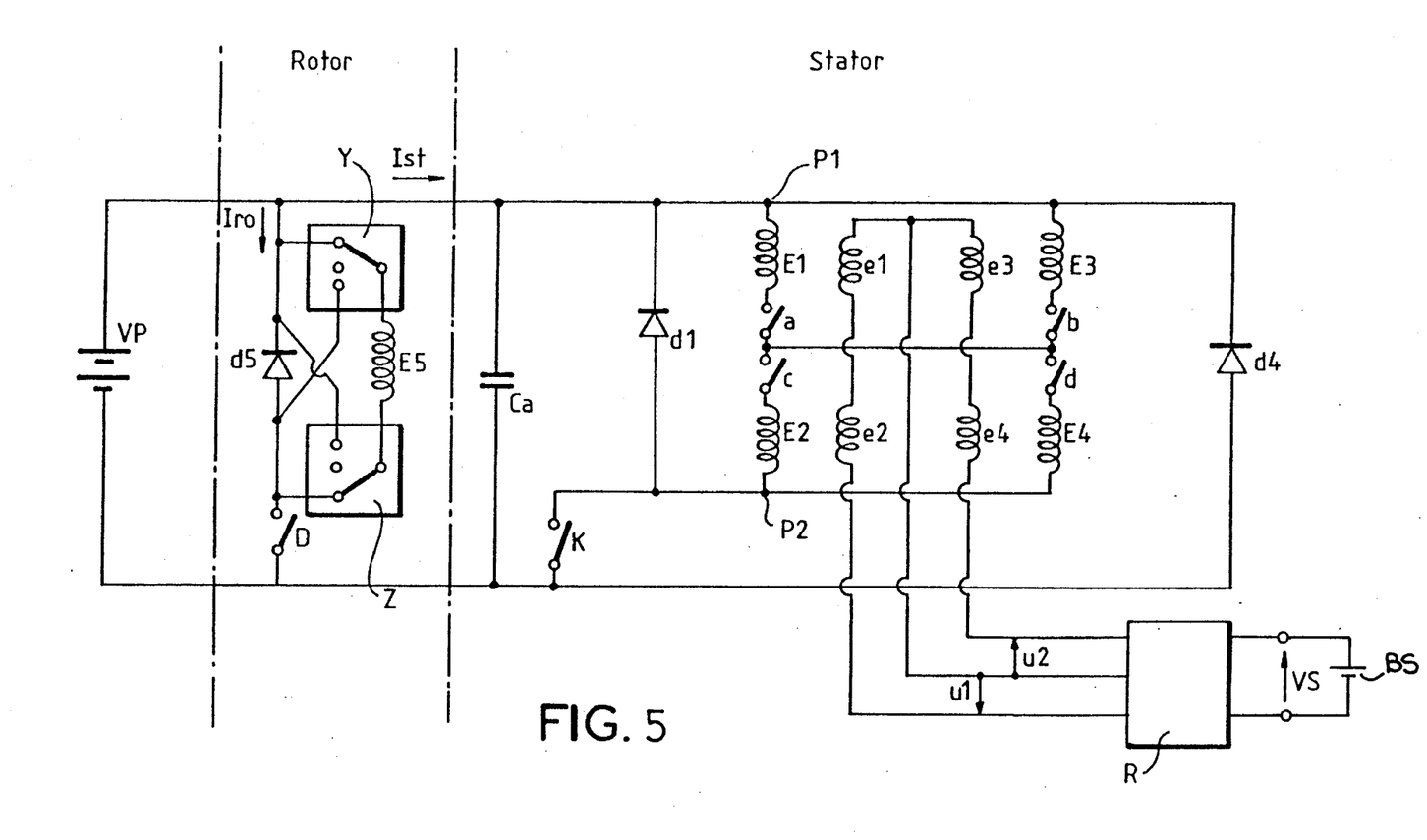
FIG. 5 shows the electrical diagram of the circuit that provides for the operation, in converter mode, of the motor of FIG. 1.

FIG. 5 shows the electrical diagram of a self-synchronous system according to the invention, having a converter function to recharge an auxiliary battery used for other purposes than for the working of the motor itself. For example, in an electrical vehicle, many electrical functions have to be carried out by an auxiliary battery (headlights, lighting up the dashboard etc.), and it is preferable not to take energy at the source VP for these functions.

The circuit according to the invention enables a recharging of the battery during the rotation of the motor, which is important for an automobile. The motor shown is of the same type as that of FIG. 1.

Four additional stator windings e1, e2, e3, e4 respectively coupled to the windings E1, E2, E3, E4 form the secondary winding of a transformer with midpoint. The windings E1, E2, E3, E4 form the primary winding of the transformer.

The voltages U1 and U2, one of which (U1) is located at the terminals of the two windings e1 and e2 while the other (U2) is located at the terminals of the two windings e3 and e4, are simultaneously sent to a rectifier R. The rectified voltage VS, adjusted to the desired value (6 or 12 volts), constitutes the charging voltage for the auxiliary battery BS.

In motor operation mode, the voltages U1 and U2 have a constant amplitude and a variable frequency in the flux reduction zone. According to the invention, the rectifier R may be controlled by any means known to those skilled in the art so as to authorize or not authorize the charging of the auxiliary battery at carefully chosen moments, for example moments when the performance characteristics of the motor cannot be lowered.

This operation as a converter for the supply of an auxiliary battery is compatible with the operation as a charger, with the motor stopped, described in FIG. 4, or with the operation as a brake generator described in FIG. 3. The frequency of the voltages U1 and U2 is that of the mains in the case of operation as a charger; it is the frequency of the motor in other modes of operation.

FIG. 6 shows the electrical diagram of the circuit which ensures the operation, in motor, brake generator, charger and converter modes, of a traction system using a self-synchronous motor according to the invention. This figure is given purely by way of an indication. It brings together the circuit elements used for the different types of operation described in detail in the other figures. A manual switch G enables the short-circuiting of the diode d3 which must be present in charger mode.

The operation as a motor has been described in FIG. 1 which shows a self-synchronous motor according to the invention. The switch G, shown in FIG. 6, is closed during operation as a motor.

The operation as a brake generator has been described in FIG. 3. The switch G shown in FIG. 6 is closed during this mode of operation.

The operation as a charger has been described in FIG. 4, which shows a traction system, with charger function, according to the invention. The rotor winding E5 is then connected to the mains by means of two commutatators Y and Z which furthermore make it possible to reverse the direction of operation of the motor by reversal of the direction of the rotor current. The switch G referred to in FIG. 6 is open.

The operation in converter mode, which is done simultaneously with one of the foregoing modes of operation, has been described in FIG. 5.

Figure 7:
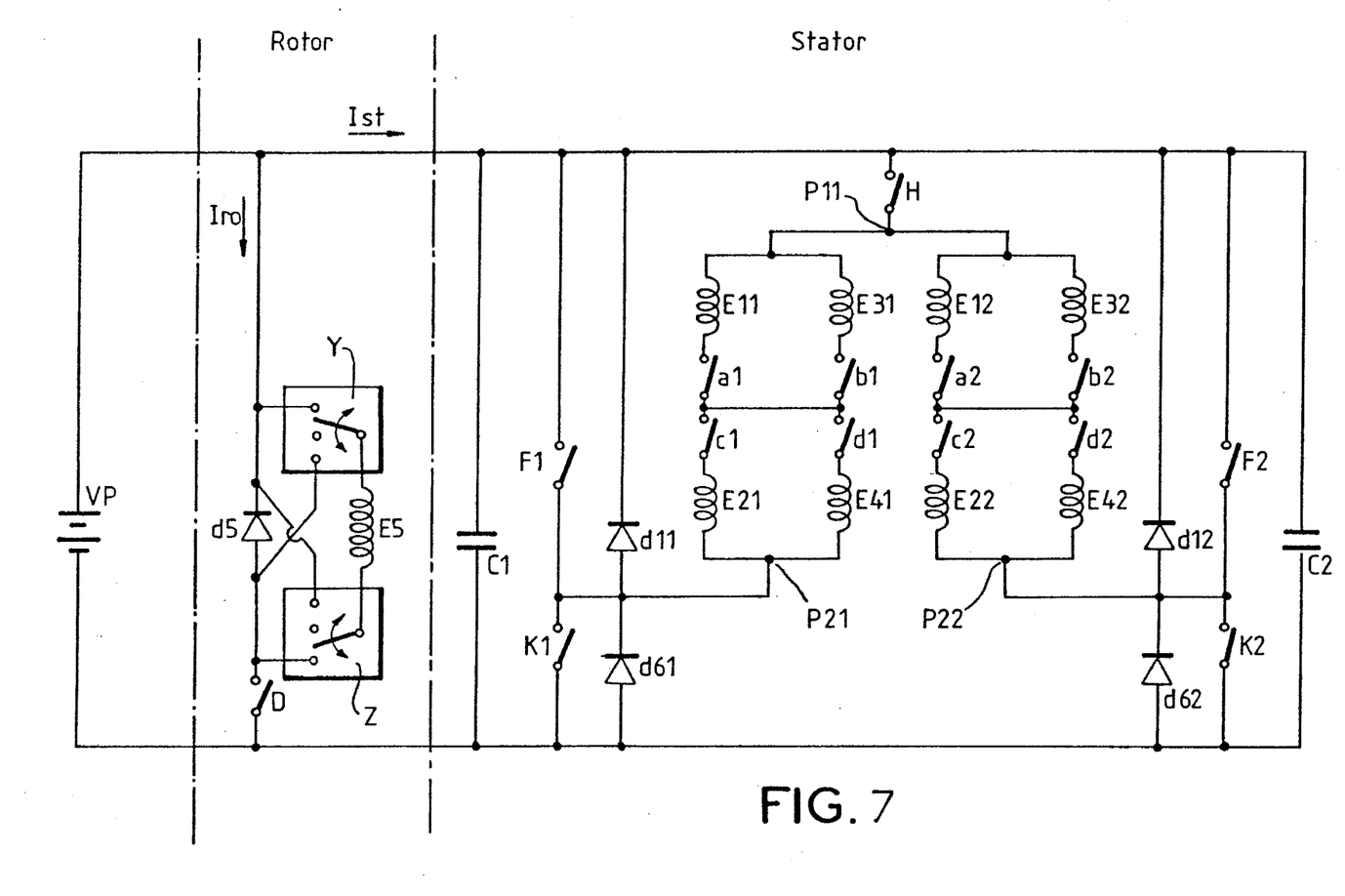
FIG. 7 shows the electrical diagram of the circuit providing for the operation, in motor, brake generator, charger and converter modes, of an electrical traction system for automobiles that uses a variant of a self-synchronous motor according to the invention.

FIG. 7 shows the electrical diagram of the circuit which carries out the operation, in motor, brake generator, charger and converter modes, of a traction system using a variant of a self-synchronous motor according to the invention.

This diagram corresponds to a circuit that can be used to reduce the torque ripples related to the variations of the stator current.

The stator of the traction system comprises several sub-assemblies of the same type as the one described in FIG. 2. Thus it is that each sub-assembly is constituted by four star-connected commutators and four windings, each winding being connected to a different commutator.

In FIG. 7, a first sub-assembly is constituted by four commutators a1, b1, c1, d1 respectively, connected to the windings E11, E31, E21, E41 and a second sub-assembly is constituted by four commutators a2, b2, c2, d2 respectively, connected to the windings E12, E32, E22, E42.

The windings E11 and E31 are connected to each other at the same point P11, in the way in which the preceding windings E1 and E3 are connected to each other at the same point P1. This is also true for the windings E12 and E32 which too are connected at the point P11.

The windings E21 and E41 are connected to each other at the same point P21, in the way in which the preceding windings E2 and E4 are connected to each other at the same point P2.

Finally, the windings E22 and E42 are connected to each other at the same point P22, in the way in which the preceding windings E2 and E4 are connected to each other at the same point P2.

The point P11 is connected to the positive terminal of the supply voltage VP by means of a switch H.

The point P21 is connected to an assembly constituted by two choppers F1 and K1 and two diodes d11 and d61 in the same way as the point P2 is connected to the assembly constituted by the two choppers F and K and the two diodes d1 and d6.

Similarly, the point P22 is connected to an assembly constituted by two choppers F2 and K2 and two diodes d12 and d62 in the same way as the point P2 is connected to the assembly constituted by the two choppers F and K and the two diodes d1 and d6.

In motor and brake generator operation, the switch H is closed.

In charger operation, the switch H is open.

For reasons of convenience, the windings used for the operation as a converter have not been shown in FIG. 7. It is clear that windings coupled either to the windings E11, E21, E31, E41 or to the windings E12, E22, E32, E42 or to all the above-named windings can be used to constitute the secondary winding of a transformer of the same type as the one described in FIG. 5.

As described here above, the stator according to this second embodiment of the invention is constituted by two half-stators of the same type as the stator described according to the first embodiment.

With each of these half-stators, there is associated a current injection capacitor: C1 for the sub-assembly constituted by the windings E11, E21, E31, E41 and C2 for the sub-assembly constituted by the windings E12, E22, E32, E42.

According to the invention, the two sub-assemblies described here above are arranged so that the windings of one of them is at 45° with respect to the windings of the other one. An arrangement such as this enables an advantageous reduction in the torque ripples owing to the modification of the stator current.

According to this second embodiment, the value of the stator current which passes into a sub-assembly is equal to half of the value of the total stator current Ist. The current that must be given by the injection capacitors C1 and C2 is advantageously reduced through the offset between the two motors. Indeed, when there is no current in a half-stator (cf. the commutation of the rings of the motor), the second half-stator is crossed by a current. Thus, the configuration using two half-stators is accompanied by a permanent presence of stator current, enabling an advantageous reduction in the size of the current injection capacitors.

Another advantage of this embodiment is that it does not necessitate the addition of diodes designed especially for the operation in charger mode as was the case earlier (diodes d3 and d4). The diodes d11 and d62 fulfil the roles of d1 and d4 respectively (FIG. 4): the closed switch K1 lets through, to the diode d62, the current generated in the series-connected windings E22, E12, E11, E21 (assuming that these are the windings connected together by the mechanical commutator devices in the position in which the rotor is stopped). By the opening of the switch K1, the current is diverted towards the source VP through the diode d11. The diodes d12 and d61 with the switch F1 reciprocally play the role of the diodes d3 and d6 with the switch F of FIG. 7.

Another advantage of the invention is that it enables a back-up operation through the redundancy of the device.

Indeed, if certain of the electronic choppers of one of the two half-stators were to go out of order, then the traction system could always be made to work with the other half-stator.

According to the embodiment described in FIG. 7, the device has two half-stators. It is clear that it could include a number of half-stators greater than two.

For all the circuits described in FIGS. 1 to 7, the reversal of the direction of operation of the rotating electrical machine can be done by reversing the flux of the machine, which amounts to reversing the direction of the current in the rotor winding E5 by means of the commutators Y and Z.

There are, however, other ways of reversing the direction of operation of the motor.

A first way consists in activating the reversal of the direction of operation by means of a mechanical pack.

Figure 8:
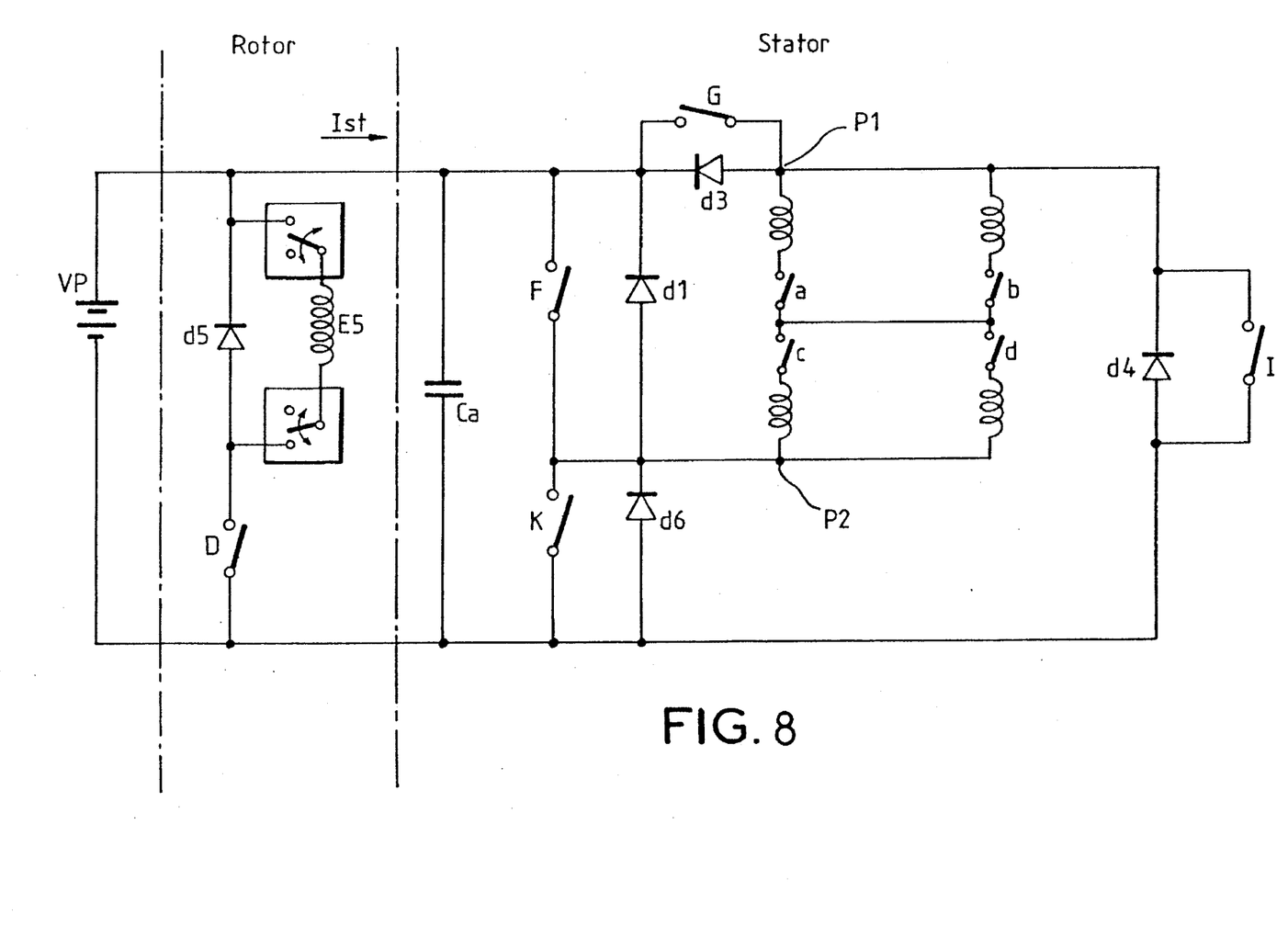
FIG. 8 shows the electrical diagram of the circuit providing for the operation, in motor, brake generator, charger and converter modes, of an electrical traction system for automobiles using another variant of a self-synchronous motor according to the invention.

Another method, as described in FIG. 8, consists in shifting the connections of the motor with respect to the bridge arm constituted by the choppers F and K of the device described in FIG. 6.

In FIG. 8, the rotor winding E5 has each of its ends connected to a two-way commutator that may or may not enable the linking of said winding with the circuit so as to be capable of ensuring or not ensuring operation in motor, brake generator and converter modes, the operation in charger mode being done when the winding E5 is not connected to the circuit.

According to the configuration described in FIG. 8, a commutator I is placed in parallel with the diode d4.

To obtain a first direction of rotation, the switch G is closed and the switch I is open. The operation in motor mode uses the chopper K and diode d1 as described in FIG. 1. Similarly, the operation in brake generator mode uses the chopper F and the diode d6 as described in FIG. 3.

To obtain a second rotational direction, the switch G is open and the switch I is closed. The motor operation is then achieved by means of the chopper F and the diode d6 and the brake generator operation by means of the chopper K and the diode d1. The charger function is obtained, at the stator, by opening the switches G and I.

According to the invention, and irrespectively of the embodiment described in the foregoing figures (cf. FIGS. 1 to 8), the control of the speed and of the torque is achieved by a double action on the rotor and stator currents.

The chopper D, associated with the diode d5, enables the control of the rotor current. A reduction of this current prompts a flux reduction which enables overspeed operation.

This double action makes it possible to cover the entire range of operation in terms of torque/speed of the traction motor in its various modes of use. Thereafter, care is taken to operate in zones of maximum efficiency.

According to the embodiments described here above, the rotor is provided with a rotor winding E5. The invention relates also to embodiments in which the rotor is constituted by several rotor windings or by one or more magnets. In the embodiment in which the rotor is constituted by magnets, the reversal of the direction of operation can no longer be obtained by a reversal of flux but in any one of the above-mentioned ways (cf. the mechanical pack device or the device described in FIG. 8).

The flux reduction which enables overspeed operation is then obtained by the shifting of the rotor with respect to the stator by means of a mechanical device that is controlled, for example, by the centrifugal force.

According to this embodiment, the operation in charger mode can no longer be achieved with the rotor winding E5 as described here above. Other circuits, for example a new stator winding, enable the performance of the same function as that fulfilled by the winding E5.

In the entire foregoing description, the example chosen for the electrical generator is that of an accumulator. The invention also relates to a combined traction system in which the electrical generator includes a power unit.

What is claimed is:

1. A self-synchronous electrical motor comprising a rotor (E5), a stator possessing at least one set of four windings E1, E2, E3, E4 offset by 90 electrical degrees with respect to one another, a first electronic switch (K) connected to a stator winding, (E2, E4,) and activated by a chopper circuit (CC) at high frequency to control a mean current Ist) in the stator winding (E2, E4), and a sensor (s) of angular position of the rotor (E5) alto activate the chopper circuit (CC), a rotating mechanical commutator (BT) driven by the rotor (E5), the commutator (BT) being connected to a first end of each of the windings (E1, E2, E3, E41), second end (P1) of two of the windings (E1, E3) being connected to a power supply source (Vp), a second end (P2) of the other two windings (E2, E4) being connected to the first electronic switch (K) so as to make the current given by the source (Vp) pass successively into two series-connected windings taken from among the four windings, these two windings being offset by 90 electrical degrees.

2. A self-synchronous electrical motor according to claim 1, wherein the commutator device comprises a rotating ring driven by the rotor and four fixed brushes rubbing against the ring.

3. A self-synchronous electrical motor according to claim 2, wherein each brush is connected to the first end of a stator winding and the ring comprises at least one conductive part capable of connecting the brushes to one another.

4. A self-synchronous electrical motor according to either of the claims 2 or 3, wherein the ring is formed by a conductive half-ring and an insulating half-ring.

5. A self synchronous electrical motor according to claim 1 comprising a second electronic switch (F) activated by a chopper circuit, said second electronic switch being parallel-connected to two series-connected stator windings (E1, E2) to control the current in said stator windings, and when said first electronic switch K is open, a free wheel diode (d6) is connected between the supply source (Vp) and said two series-connected stator windings (E1,E2) to prevent the passage of a power supply source discharging current.

6. A self synchronous electrical motor according to claim 1 wherein said rotor has at least a winding E5; means for recharging the supply source (Vp) when the motor is off, and using said rotor winding (E5), and said first electronic switch (K) connected to said stator winding (E2 or E4); said rotor winding being used as a primary winding of transformer, said recharging means including means for connecting said primary winding (E5) to a supply mains, said stator winding E2 or E4 and said first electronic switch (K) being used as a secondary winding of said first transformer.

7. A self synchronous electrical motor according to claim 6 wherein said first electronic switch (K) has a first end connected to a first end of a first diode (d1) and to said stator winding (E2 or E4) a second end of the first electronic switch (K) being connected to a first terminal of said supply source (Vp), the second end of said first diode (d1) being connected to the second terminal of said supply source (Vp), the secondary winding of said transformer being connected between a first extremity and a second extremity of a first additional diode (d4).

8. A self synchronous electrical motor according to claims 7, wherein the means for recharging the supply source (Vp) further comprises a second electronic switch (F) having a first end connected to a first end of a second diode (d6), a second end of the second electronic switch being connected to the second terminal of said supply source (Vp), a second end of the second diode (d6) being connected to the first terminal of said supply source (Vp), the second terminal of said supply source (Vp) being connected to said secondary winding of said transformer through a second additional diode (d3).

9. A self synchronous electrical motor according to claim 1, wherein the stator comprises at least one additional winding e1 electromagnetically coupled to the stator winding (E1); and further comprising a rectifier circuit (R) connected between the additional winding (E1) an auxiliary battery (Vs) whereby the auxiliary battery is recharged.

10. A self synchronous electrical motor according to claim 9, wherein said additional winding comprises a plurality of four additional windings (e1, e2, e3, e4), each being eletromagnetically coupled to the set of four stator windings (E1, E2, E3, E4), said additional windings being used as a secondary winding with a midpoint of a transformer, said set of four stator windings E1, E2, E3, E4) being used as creating a primary winding of said transformer.

* * * * *